United States Patent
Liu et al.

(10) Patent No.: US 10,831,541 B2
(45) Date of Patent: Nov. 10, 2020

(54) PERFORMANCE OPTIMIZATION OF HARDWARE ACCELERATORS

(71) Applicant: International Business Machines Corporation, Armonk, NY (US)

(72) Inventors: Yang Liu, Shanghai (CN); Yong Lu, Shanghai (CN); Peng Ou, Shanghai (CN); Hong Bo Peng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/039,422

(22) Filed: Jul. 19, 2018

(65) Prior Publication Data

US 2018/0321978 A1 Nov. 8, 2018

Related U.S. Application Data

(63) Continuation of application No. 15/098,475, filed on Apr. 14, 2016, now Pat. No. 10,055,255.

(51) Int. Cl.
*G06F 9/50* (2006.01)
*G06F 3/06* (2006.01)

(52) U.S. Cl.
CPC .......... *G06F 9/5016* (2013.01); *G06F 3/0604* (2013.01); *G06F 3/0631* (2013.01); *G06F 3/0673* (2013.01); *G06F 9/5033* (2013.01); *G06F 9/5044* (2013.01)

(58) Field of Classification Search
CPC .................................................. G06F 9/5016
See application file for complete search history.

(56) References Cited

U.S. PATENT DOCUMENTS

| | | | |
|---|---|---|---|
| 6,209,078 B1* | 3/2001 | Chiang | G06F 9/30014 345/505 |
| 7,734,895 B1* | 6/2010 | Agarwal | G06F 8/52 712/13 |
| 2010/0205606 A1* | 8/2010 | Panzer | G06F 9/4484 718/102 |
| 2012/0155495 A1 | 6/2012 | Clee | |
| 2013/0166724 A1 | 6/2013 | Bairavasundaram | |
| 2014/0149682 A1 | 5/2014 | Blaner | |
| 2015/0205632 A1 | 7/2015 | Gaster | |
| 2015/0363232 A1 | 12/2015 | Li | |

(Continued)

OTHER PUBLICATIONS

Funk, "Addressing is the Secret of Power8 CAPI," The Platform, Jun. 22, 2015, 26 pages, <http://www.theplatform.net/2015/06/22/the-secret-of-power8-capi-is-addressing/>.

(Continued)

*Primary Examiner* — Charlie Sun
(74) *Attorney, Agent, or Firm* — Jay Wahlquist

(57) ABSTRACT

Example embodiments of the present disclosure provide methods and devices for optimizing performance of hardware accelerators. The accelerator device may detect status information of a current acceleration task being executed. The detected status information is provided to a host associated with the accelerator device. The host makes preparation for a subsequent acceleration task based on the status information before termination of the current running acceleration task. The accelerator device may execute the subsequent acceleration task based on the preparation. In this way, the performance of hardware accelerator is optimized.

15 Claims, 7 Drawing Sheets

(56) References Cited

U.S. PATENT DOCUMENTS

| | | | |
|---|---|---|---|
| 2016/0110221 A1* | 4/2016 | Hosomi | G06F 9/5044 |
| | | | 718/104 |
| 2017/0061566 A1 | 3/2017 | Min | |
| 2017/0177396 A1* | 6/2017 | Palermo | H04L 49/70 |
| 2017/0300362 A1 | 10/2017 | Liu | |

OTHER PUBLICATIONS

List of IBM Patents or Patent Applications Treated as Related. Filed Jul. 19, 2018 2 pages.

Sleibso, "CAPI Acceleration Development Kit brings coherent FPGA acceleration to IBM POWER8 servers," Xilinx Inc., Xcell Daily Blog, Jun. 10, 2015, 4 pages, <http://forums.xilinx.com/t5/Xcell-Daily-Blog/CAPI-Acceleration-Development-Kit-brings-coherent-FPGA/ba-p/634457>.

Sleibso, "Low-Power Coherent Accelerator Board boosts performance of IBM Power8 Servers through CAPI," Xilinx Inc., Xcell Daily Blog, Mar. 20, 2015, 3 pages, <http://forums.xilinx.com/t5/Xcell-Daily-Blog/Low-Power-Coherent-Accelerator-Board-boosts-performance-of-IBM/ba-p/571492>.

Stuecheli et al., "CAPI: A Coherent Accelerator Processor Interface," IBM Journal of Research and Development, vol. 59, Issue 1, Jan.-Feb. 2015, 7 pages.

Wile, "Coherent Accelerator Processor Interface (CAPI) for POWER8 Systems," IBM, White Paper, Sep. 29, 2014, 7 pages, <http://www.nallatech.com/wp-content/uploads/CAPI_POWER8.pdf>.

\* cited by examiner

PERFORMANCE OPTIMIZATION OF HARDWARE ACCELERATORS

BACKGROUND

The present disclosure relates to computer hardware, and more specifically, to overlapping the execution, and preparation for execution, of hardware accelerator tasks to improve computer system performance.

Computing systems may be configured to execute operations to manipulate large volumes of data according to defined algorithms. Execution of these operations include transferring data between memory and central processing units (CPUs) via I/O subsystems configured to, inter alia, provide I/O support CPUs and maintain data coherency between memory and various components of a computing system. The workload of a CPU may be affected by the volume of data being processed and the computational complexity of the algorithms for processing the data.

Some customer-specific and/or computation-heavy algorithms may be offloaded from a CPU to a hardware accelerator such as a Field Programmable Gate Array (FPGA), thereby reducing workload of the CPU. Communications and coherency between the hardware accelerator and the host machine may be controlled by a coherent accelerator processor interface to remove the overhead and complexity of the I/O (Input/Output) subsystem, for example. Since the accelerator device is a hardware engine, it may be difficult for it to service, or execute, certain I/O functions. Conventionally, hardware accelerators receive help from, or utilize the resources of, host processors and operating system (OS) to service some of these I/O functions. Relying on a host to service I/O operations may negatively impact performance of hardware accelerators.

SUMMARY

Example embodiments of the present disclosure provide methods and devices for optimizing performance of hardware accelerators.

In an embodiment, an accelerator device is provided. The accelerator device includes an acceleration engine and a detector. The detector is configured to detect status information of a first acceleration task being executed by the acceleration engine, and provide the detected status information to a host associated with the accelerator device. The acceleration engine is configured to execute a second acceleration task based on a preparation for the second acceleration task, where the preparation is made by the host based on the status information before termination of the first acceleration task. An advantage provided by this embodiment to improve performance of accelerator devices by reducing the amount of time between the execution of two adjacent or consecutive acceleration task.

In another embodiment, a method implemented by an accelerator device is provided. The method comprises steps of detecting status information of a first acceleration task being executed by the accelerator device; providing the detected status information to a host associated with the accelerator device; receiving from the host a preparation for a second acceleration task, where the preparation is made by the host based on the status information before termination of the first acceleration task; and executing the second acceleration task based on the preparation. An advantage provided by this embodiment to improve performance of accelerator devices by reducing the amount of time between the execution of two adjacent or consecutive acceleration task.

In yet another embodiment, a method implemented by a host is provided. The method comprises steps of receiving, from an accelerator device associated with the host, status information of a first acceleration task being executed by the accelerator device; preparing for a second acceleration task to be executed by the accelerator device based on the status information before termination of the first acceleration task; and providing the preparation for the second acceleration task to the accelerator device for executing the second acceleration task. An advantage provided by this embodiment to improve performance of host computing systems by reducing the amount of time between the execution of two adjacent or consecutive acceleration task.

It is to be understood that the Summary is not intended to identify key or essential features of embodiments of the present disclosure, nor is it intended to be used to limit the scope of the present disclosure. Other features of the present disclosure will become easily comprehensible through the description below.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Throughout the drawings, the same or similar reference numerals represent the same or similar elements.

Figure 1:
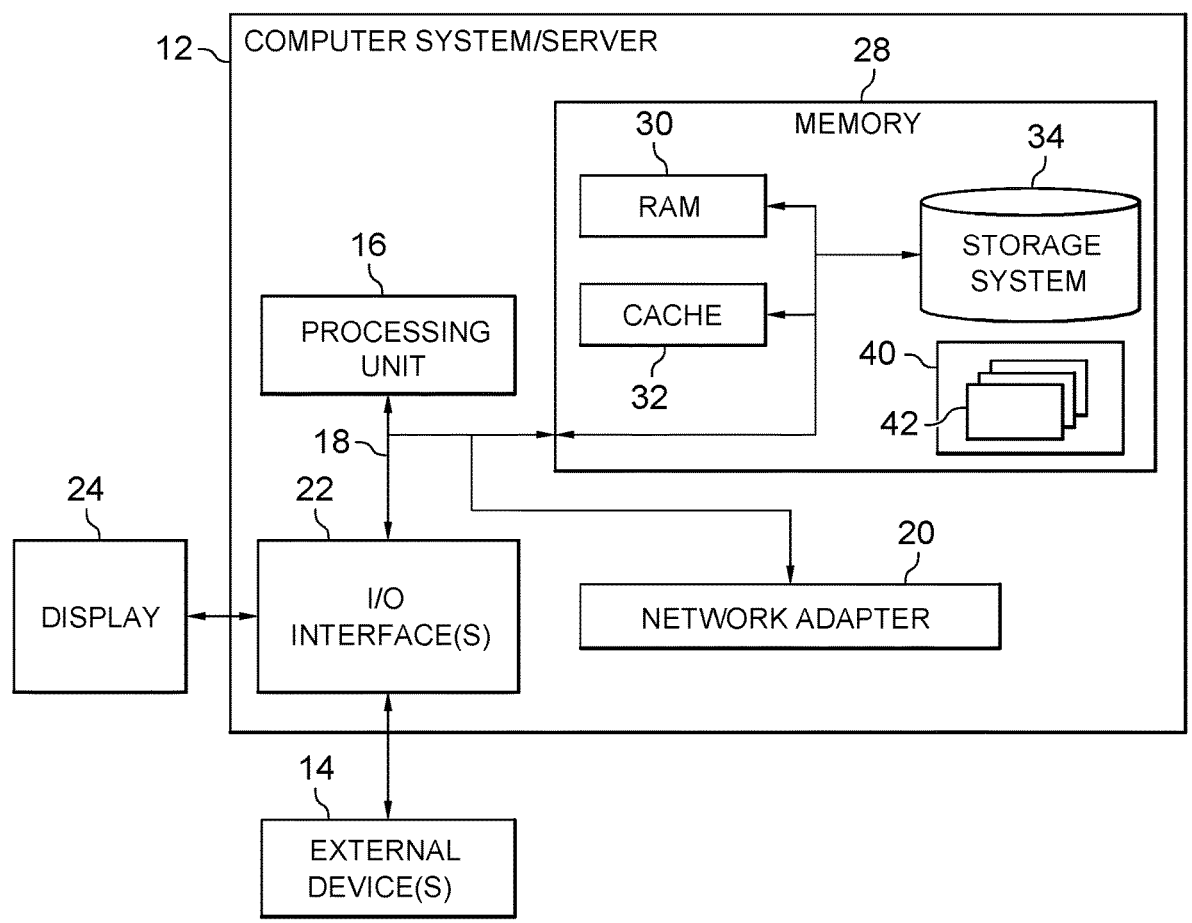
FIG. 1 is a block diagram of an electronic device suitable for implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device or system. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Now some example embodiments of the present disclosure will be described. As described herein, in order to reduce the workload of the host processor(s), some customer-specific and/or computation-heavy tasks may be offloaded to one or more hardware accelerators coupled to the host. Examples of such hardware accelerators include, but are not limited to, FPGAs, Application Specific Integrated Circuit (ASIC), and the like. Only for ease of discussions, some embodiments will be described with reference to FPGAs in the following paragraphs. An FPGA may contain an array of programmable logic blocks which can be configured to perform complex combinational functions. The FPGA configuration may be specified using a Hardware Description Language (HDL). The FPGA is only one example hardware accelerator. Embodiments of the present disclosure apply to any other suitable accelerator devices either currently known or to be developed in the future.

A hardware accelerator such as an FPGA may work as an I/O device in a physical memory address space. The processor core(s) of the host, however, may work in a virtual memory address space. In order to remove the overhead and complexity of the I/O subsystem (which is a traditional way to use FPGA accelerators) and to allow an accelerator device to operate as part of an application, a coherent accelerator processor interface may be used to allow the tasks running (e.g., or executing) on the accelerator to access virtual memory space, just like other applications running on the processor cores. This facilitates interactions between the accelerator device and the host.

However, since the accelerators such as FPGAs are hardware engines, some I/O functions may be difficult to be service (e.g., fulfill), even though these functions may be easily executed by the processor cores on the host with OS running. During execution of an acceleration task on the hardware accelerator, intervention from the host (e.g., to help service an I/O function) may impact performance of the entire computing system. In order to address this and other potential problems, in accordance with embodiments of the present disclosure, status information about an acceleration task being executed by the accelerator device may be monitored and reported to the host. Based on the status information, the host may make preparation for the execution of one or more subsequent acceleration tasks. That is, the preparation is overlapped with the execution of the current acceleration task. In this way, acceleration tasks may be executed more efficiently with limited interruptions.

Figure 2:
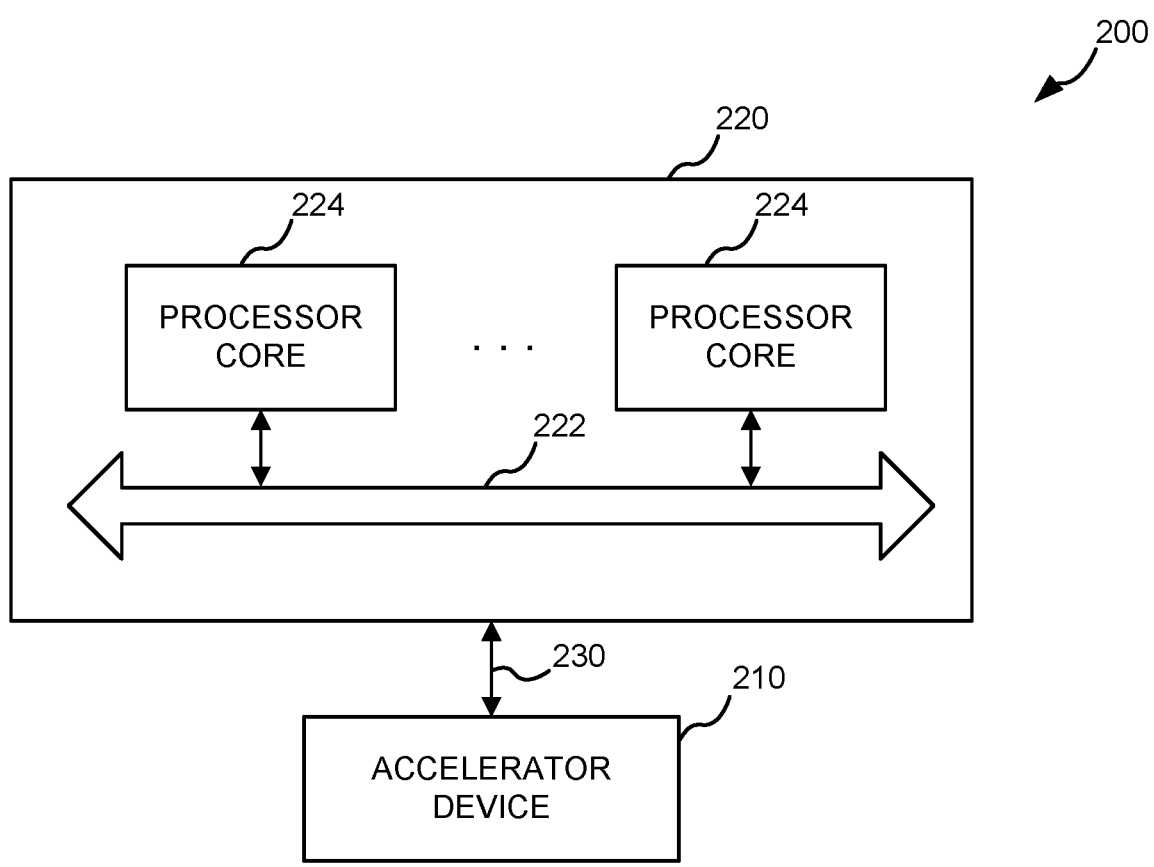
FIG. 2 is a block diagram of a system with hardware accelerator device where embodiments of the present disclosure can be implemented.

FIG. 2 shows a block diagram of a system 200 in which embodiments of the present disclosure can be implemented. As shown, the system 200 includes an accelerator device 210 and a host 220 associated with one another. In some embodiments, the accelerator device 210 may be an FPGA card, as described herein, and the host 220 may be implemented by the computer system/server 12 discussed with reference to FIG. 1. In one embodiment, the accelerator device 210 may be coupled to the host 220 by means of a slot such as a Peripheral Component Interconnect (PCI) slot or PCI express (PCIe) slot. Other coupling mechanisms are possible as well. The accelerator device 210 and the host 220 may communicate with each other via an interface 230. In some embodiments, the interface 230 is a coherent processor accelerator interface which enables tasks executing on the accelerator device 210 to access a virtual memory space, for example.

In some embodiments, the accelerator device 210 may be connected, or coupled, to an interconnection 222 included in the host 210. One or more processor cores 224 may be also connected to the interconnection 222. Each processor core 224 may include a cache (not shown) for high-speed data access. The interconnection 222 may be connected to a memory bus (not shown) to enable the processor cores 224 as well as the accelerator device 210 to access the memory subsystem of the host 220. With this configuration, the accelerator device 210 may operate in a similar way to the processor cores 224 (e.g., the accelerator device may retrieve and process data from the memory subsystem of the host).

Figure 3:
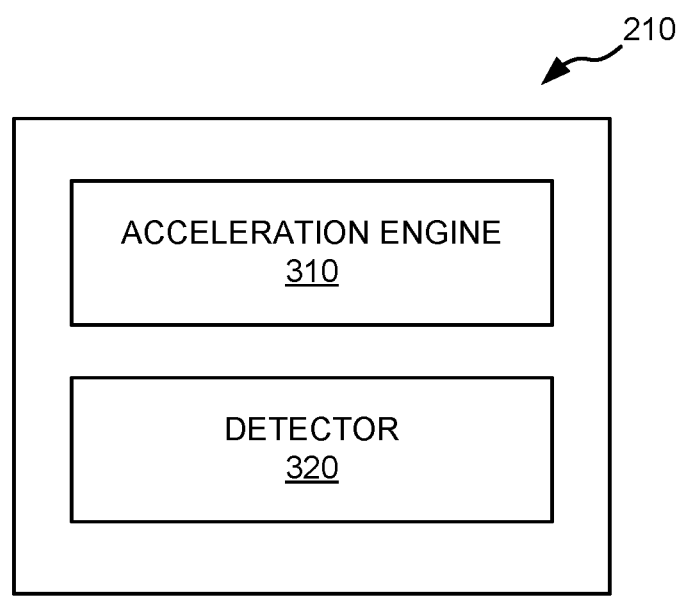
FIG. 3 is a block diagram of the accelerator device in accordance with embodiments of the present disclosure.

FIG. 3 shows a block diagram of the accelerator device 210 in accordance with embodiments of the present disclosure. As shown, the accelerator device 210 includes an acceleration engine 310 and a detector 320. Alternative modifications and variations may be made to the accelerator device 210. For example, although the acceleration engine 310 and detector 320 are shown as two separated components, they can be implemented in a single physical module (for example, a chip) in some embodiments.

The acceleration engine 310 executes acceleration tasks assigned to the accelerator device 210 by the host 220 (FIG. 2). As an example, in embodiments where the accelerator device 210 is an FPGA card, the acceleration engine 310 may be referred to as Acceleration Function Unit (AFU). As used herein, an acceleration task is a function that is assigned by the host 220 to be executed on the accelerator device 210. Examples of acceleration tasks include, but are not limited to, customer-specific tasks, computation-heavy tasks, and the like. Specific examples include compressing, encrypting, or filtering a block of data. In some embodiments, one acceleration task corresponds to a complete acceleration function. In other embodiments, multiple acceleration tasks together achieve an acceleration function. That is, a single acceleration function may include multiple acceleration tasks.

Conventionally, there may be a "gap" (e.g., a span of time, or a time period) between the execution of two adjacent acceleration tasks. More specifically, when the current acceleration task is completed (e.g., finished executing), it may be necessary to make preparation for a subsequent acceleration task to be executed. Before executing a new acceleration task, for example, a system may need to prepare memory space for the new acceleration task, pre-process data/information, set initial values for variables, or the like. Alternatively, or in addition, some "housekeeping" operations may be done for the current acceleration task, such as verification of the obtained results. Servicing the some of these operations may require intervention of one or more processor corers 224 and thus may degrade the system performance.

Figure 4:
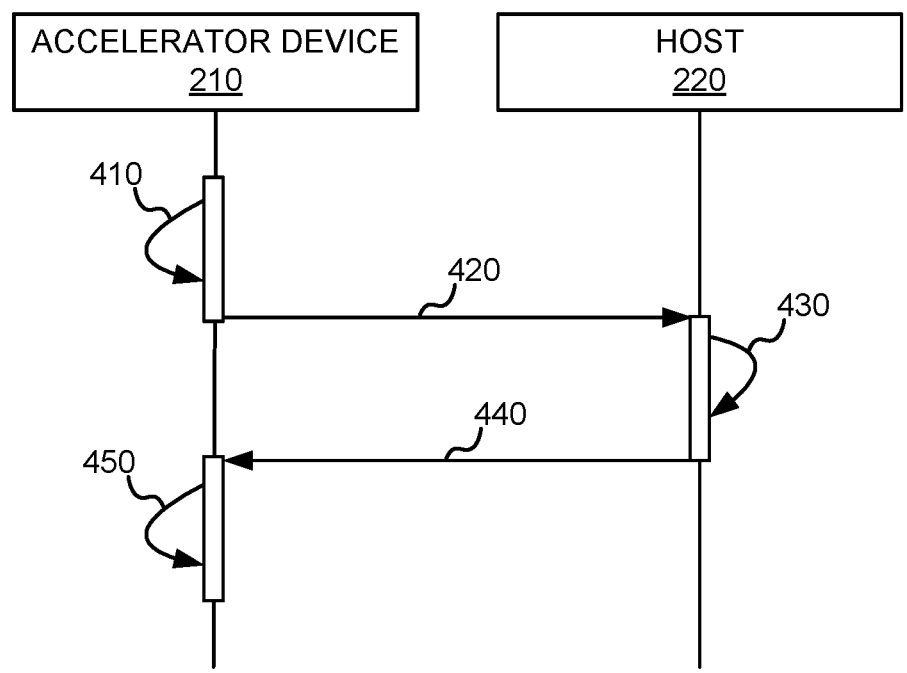
FIG. 4 is a diagram of operations and interactions of the accelerator device and host in accordance with embodiments of the present disclosure.

In accordance with embodiments of the present disclosure, the gap the execution of between acceleration tasks may be shortened or eliminated by use of detector 320 included in the accelerator device 210. As shown in FIG. 4, in operation, the detector 320 detects (410) status information of the acceleration task being executed by the acceleration engine 310. In some embodiments, the detector 320 may detect the status information periodically. In some embodiments, the period for detecting the status information is configurable and can be set using HDL, for example. Alternatively, or in addition, in some embodiments, the detector 320 may detect the status information on demand. That is, the host 220 may send a query to the accelerator device 210 via the interface 230 to trigger the detector 320 to detect the status information.

The status information detected by the detector 320 may include any suitable information indicating the execution status of the current running acceleration task. For example, in one embodiment, the status information may include the completion percentage of the current acceleration task. Alternatively, or in addition, in embodiments where the acceleration engine 310 has a cache, the status information may include the cache hit/miss rate of the current acceleration task. In another embodiments where the current acceleration task needs to fetch data from the memory, the status information may include latency of the data fetch. These are just some examples of the status information, without suggesting any limitations as to the scope of the present disclosure. Any information indicating the status of the current acceleration task may be detected by the detector 320.

The detector 320 provides (420) the detected status information to the host 220 via the interface 230 between the accelerator device 210 and the host 220. As described above, the status information may be provided periodically or in response to the query from the host 220. Upon receipt of the status information, the host 220 may prepare (430) for a subsequent acceleration task(s) to be executed by the accelerator device 210. Depending on the status information, the host 220 may make any appropriate preparations for one or more acceleration tasks to be executed on the accelerator device 210. For example, in some embodiments, if the status information indicates that the completion percentage exceeds a predefined threshold, the host 220 may trigger allocation of a memory space to the subsequent acceleration task. Alternatively, or in addition, the host 220 may initialize one or more variables to be used in the subsequent acceleration task, pre-process data to be used in the subsequent acceleration task, or the like.

Specifically, in some embodiments, the preparation for the subsequent acceleration task may include "housekeeping" operations for the current running acceleration task. For example, the host 220 may trigger analysis of the result obtained from the current acceleration task. Alternatively, or in addition, the host 220 may verify or check the obtained result. In some embodiments, the host 220 may release some or all memory space allocated to the current acceleration task. Any additional or alternative housekeeping operations can be performed.

The preparation may be provided (440) by the host 220 to the accelerator device 210 via the interface 230. The accelerator device 210 may then execute (450) the subsequent acceleration task based on the preparation provided by the host 220. For example, the subsequent acceleration task may directly use the variables which were initialized, and/or access the memory space that has been allocated, by the preparation. In this way, overhead caused by switching between different acceleration tasks may be reduced.

It is to be understood that although only one round of interactions between the accelerator device 210 and the host 220 is shown in FIG. 4, this is only for purpose of illustration without suggesting any limitations as to the scope of the present disclosure. In some embodiments, during the execution of an acceleration task, the detector 320 may detect and provide the status information to the host 220 several times, and the host 220 may provide the preparation either in multiple rounds or in one shot. Moreover, given the status information of the current running acceleration task, in some embodiments, the host 220 may prepare for more than one subsequent acceleration task.

Figure 5A:
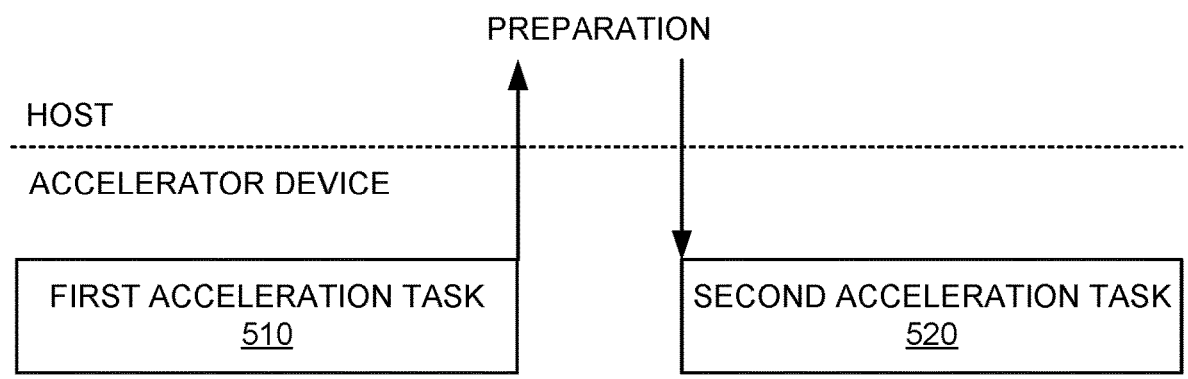
FIGS. 5A and 5B shows execution of acceleration tasks on a conventional accelerator device and on the accelerator device in accordance with embodiments of the present disclosure, respectively.
Figure 5B:
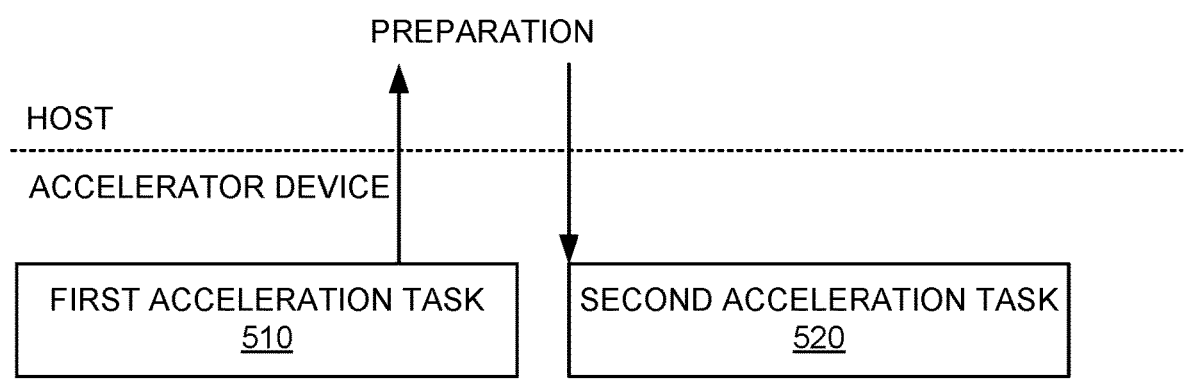

FIGS. 5A and 5B depicts overheads caused by switching between acceleration tasks on a conventional accelerator device and the accelerator device 210 according to embodiments of the present disclosure, respectively. As shown in FIG. 5A, in a conventional hardware accelerator device, the host may not prepare for a second acceleration task 520 until a previously executed first acceleration task 510 is completed. As a result, the gap between the first and second acceleration tasks may be large, degrading the efficiency and performance of the accelerator device 210 and the entire system 200.

Embodiments of the present disclosure may address this deficiency of conventional accelerators. As described herein, for example, the detector 320 detects and provides status information of the first acceleration task one or more times during the execution of the first acceleration task. This enables the host to prepare for the second acceleration task 520 in advance before the termination of the first acceleration task 510. That is, the preparation for the second acceleration task and the execution of the first acceleration task are overlapped. In this way, gap between the first and second acceleration tasks is reduced, as shown in FIG. 5B.

Figure 6:
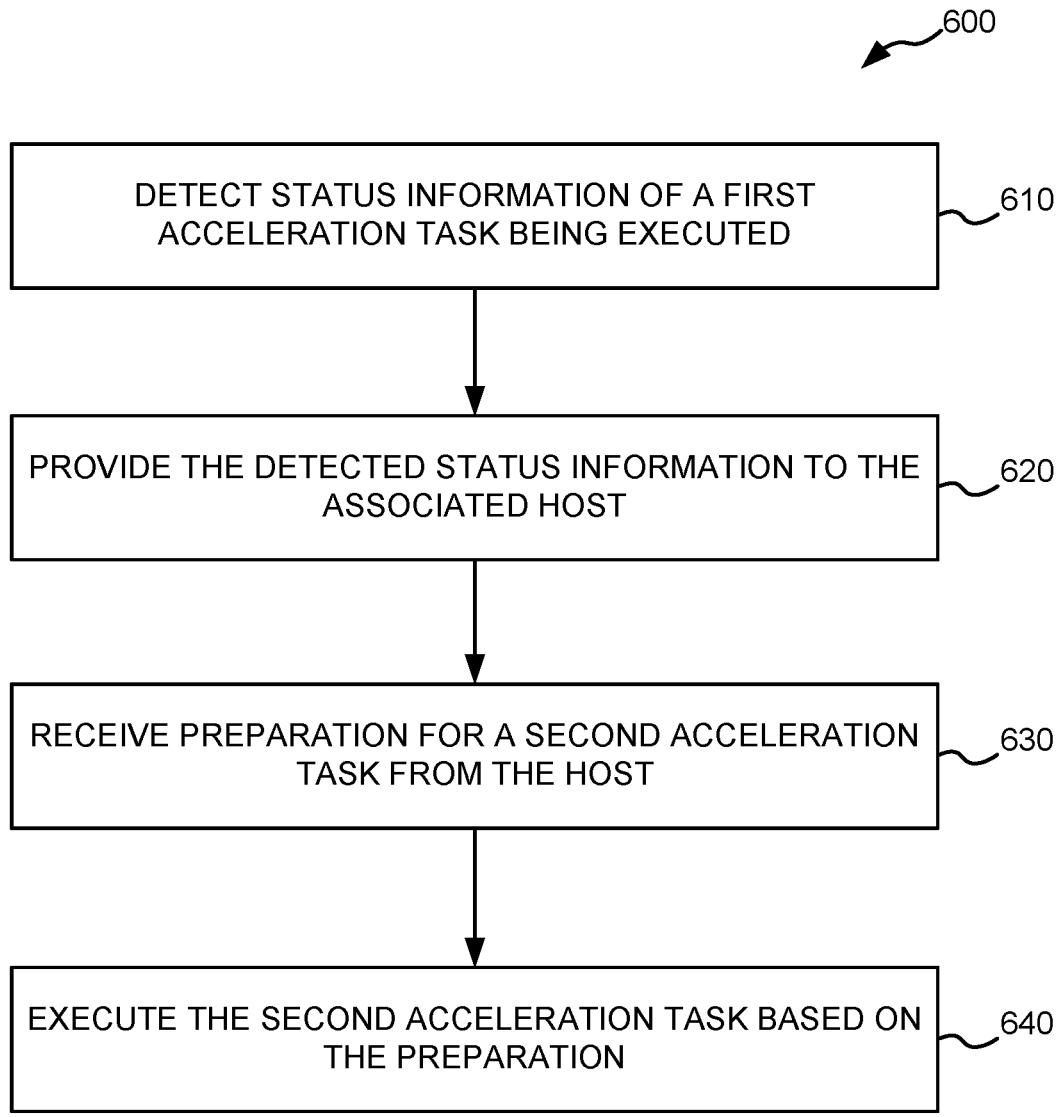
FIG. 6 is a flowchart of a method implemented by the accelerator device in accordance with embodiments of the present disclosure.

FIG. 6 shows a flowchart of a method 600 implemented by the accelerator device 210 according to embodiments of the present disclosure. In step 610, status information of a first acceleration task executed by the accelerator device is detected. The detection may be done by the detector 320 in the accelerator device 210, as described herein. Detecting the status information of the first acceleration task may include detecting at least one of the following: a completion percentage of the first acceleration task, a cache miss/hit rate of the first acceleration task, and/or a latency of data fetch by the first acceleration task. In some embodiments, the status information of the first acceleration task may be periodically detected in step 610. Alternatively, or in addition, the status information may be detected in response to receiving a query from the host 220, for example.

In step 620, the detected status information is provided to the host 220 associated with the accelerator device 210 via, for example, the interface 230. In some embodiments, the interface 230 may be implemented as a coherent accelerator processor interface, as described herein.

In step 630, preparation for a second acceleration task may be received from the host 220, where the preparation may be generated (or made) by the host 220 based on the status information before termination of the first acceleration task. The preparation may be received by either of the acceleration engine 310 or the detector 320. The method 600 may be continued at step 640. In this step, the second acceleration task is executed based on the preparation received in step 630.

By way of example, in some embodiments, the preparation received in step 630 may include an indication of at least one of the following: allocation of a memory space to the second acceleration task, initialization of one or more variables to be used in the second acceleration task, pre-processing such as pre-fetch of data to be used in the second acceleration task, and the like. Specifically, in some embodiments, the preparation for the second acceleration task may include housekeeping operations for the first acceleration task. Examples of the housekeeping operations include, but are not limited to, analysis of a result obtained by the first acceleration task, verification of the result obtained by the first acceleration task, release of a memory space allocated to the first acceleration task, and the like.

Figure 7:
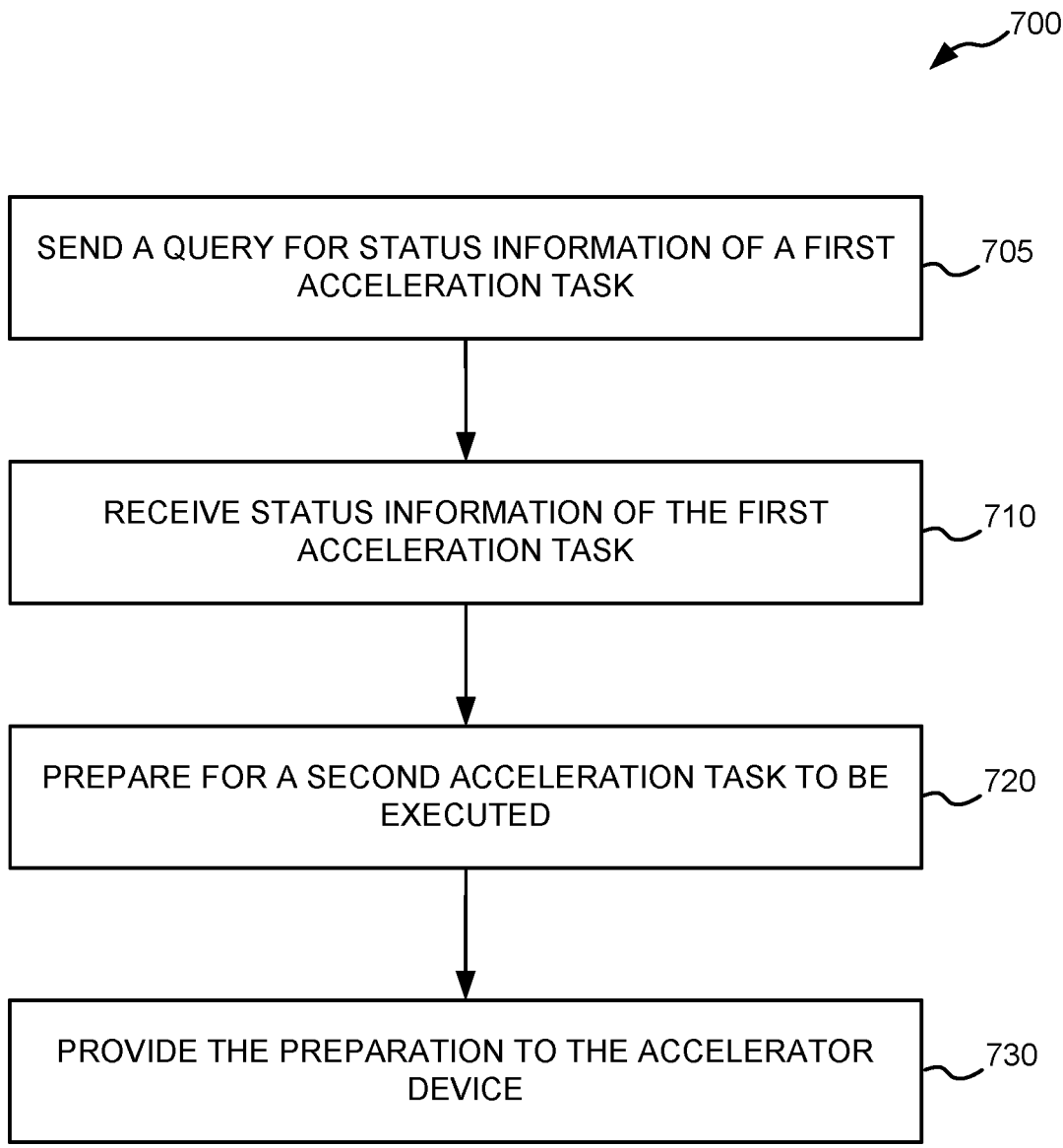
FIG. 7 is a flowchart of a method implemented by the host in accordance with embodiments of the present disclosure.

FIG. 7 shows a flowchart of a method 700 implemented by the host 220 according to embodiments of the present disclosure. In step 710, status information of a first acceleration task being executed by the accelerator device 210 may be received. For example, in some embodiments, the host 220 may receive an indication of at least one of the following: a completion percentage of the first acceleration task, a cache miss/hit rate of the first acceleration task, or a latency of data fetch by the first acceleration task. In some embodiments, the status information is periodically received. Alternatively, or in addition, in some embodiments, the host 220 may send a query to the accelerator device 210 in step 705. The query may trigger the detector 320 to detect and provide the status information.

The method 700 may be continued at step 720, where preparation is made for a second acceleration task based on the status information before termination of the first acceleration task. In some embodiments, the preparation may include allocation of memory space to the second acceleration task, initialization of variables to be used in the second acceleration task, and/or pre-processing of data to be used in the second acceleration task. Specifically, in some embodiments, the preparation for the second acceleration task may include housekeeping operations for the first acceleration task, as described herein.

The method 700 may be continued at step 730 where the host 220 provides the preparation for the second acceleration task to the accelerator device 210. The accelerator device 210 may execute the second acceleration task based on the preparation made by the host 220 in advance. By making preparation for the second acceleration task at least partially overlap the execution of the first acceleration task, the accelerator device 210 can operate more efficiently, thereby improving the performance of the entire system 200.

The present disclosure may be a system, an apparatus, a device, a method, and/or a computer program product. The computer program product may include a computer readable storage medium (or media) having computer readable program instructions thereon for causing a processor to carry out aspects of the present disclosure. For example, in some embodiments, one or more computer program products may be tangibly stored on a non-transient machine-readable medium and comprise machine-executable instructions. The instructions, when executed on a device, cause the device to implement the methods 600 and/or 700 as described above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented by a host, the method comprising:
    receiving, at the host and from a hardware accelerator device associated with the host, status information of a first acceleration task being executed by the hardware accelerator device, wherein the status information of the first acceleration task is received before termination of the first acceleration task, the status information indicating at least one of a cache miss/hit rate of the first acceleration task or a latency of data fetch by the first acceleration task;
    preparing, by the host, for a second acceleration task to be executed by the hardware accelerator device based on the status information before termination of the first acceleration task; and
    providing the preparation for execution of the second acceleration task from the host to the hardware accelerator device for executing the second acceleration task.

2. The method of claim 1, wherein preparing for the second acceleration task comprises allocating a memory space to the second acceleration task.

3. The method of claim 1, wherein preparing for the second acceleration task comprises initializing a variable to be used in the second acceleration task.

4. The method of claim 1, wherein preparing for the second acceleration task comprises pre-processing data to be used in the second acceleration task.

5. The method of claim 1, wherein preparing for the second acceleration task comprises performing a housekeeping operation for the first acceleration task.

6. A computer program product being tangibly stored on a non-transitory machine-readable medium and comprising machine-executable instructions, the instructions, when executed on a host device, causing the host device to:
    receive, at the host device from a hardware accelerator device associated with the host device, status information of a first acceleration task being executed by the hardware accelerator device, wherein the status information of the first acceleration task is received before termination of the first acceleration task, the status information indicating at least one of a cache miss/hit rate of the first acceleration task or a latency of data fetch by the first acceleration task;
    prepare, by the host device, for a second acceleration task to be executed by the hardware accelerator device based on the status information before termination of the first acceleration task; and
    provide the preparation for execution of the second acceleration task from the host device to the hardware accelerator device for executing the second acceleration task.

7. The computer program product of claim 6, wherein the instructions are configured to cause the host device to prepare for the second acceleration task by allocating a memory space to the second acceleration task.

8. The computer program product of claim 6, wherein the instructions are configured to cause the host device to prepare for the second acceleration task by initializing a variable to be used in the second acceleration task.

9. The computer program product of claim 6, wherein the instructions are configured to cause the host device to prepare for the second acceleration task by pre-processing data to be used in the second acceleration task.

10. The computer program product of claim 6, wherein the instructions are configured to cause the host device to prepare for the second acceleration task by performing a housekeeping operation for the first acceleration task.

11. A system comprising:
    a host; and
    a hardware accelerator device communicatively coupled to the host;
    wherein the hardware accelerator device comprises an integrated circuit configured, using a Hardware Description Language (HDL), to perform one or more functions;
    wherein the integrated circuit is configured to:
        execute a first acceleration task assigned by the host to be executed on the hardware accelerator device;
        detect status information of the first acceleration task before termination of the first acceleration task; and
        provide the detected status information to the host before termination of the first acceleration task;
    wherein the host comprises one or more processor cores configured to:
        receive from the hardware accelerator device, the status information of the first acceleration task, wherein the status information of the first acceleration task is received before termination of the first acceleration task, the status information indicating at least one of a cache miss/hit rate of the first acceleration task or a latency of data fetch by the first acceleration task;
        prepare for a second acceleration task during execution of the first acceleration task and before termination of the first acceleration task, the second acceleration task to be executed by the hardware accelerator device; and
        provide the preparation for the second acceleration task to the hardware accelerator device for executing the second acceleration task;
    wherein the integrated circuit of the hardware accelerator device is configured to execute the second acceleration task based on the preparation for the second acceleration task.

12. The system of claim 11, wherein the one or more processor cores of the host are configured to prepare for the second acceleration task by allocating a memory space to the second acceleration task.

13. The system of claim 11, wherein the one or more processor cores of the host are configured to prepare for the second acceleration task by initializing a variable to be used in the second acceleration task.

14. The system of claim 11, wherein the one or more processor cores of the host are configured to prepare for the second acceleration task by pre-processing data to be used in the second acceleration task.

15. The system of claim 11, wherein the one or more processor cores of the host are configured to prepare for the second acceleration task by performing a housekeeping operation for the first acceleration task.

* * * * *